United States Patent
Melia et al.

(10) Patent No.: US 9,485,799 B2
(45) Date of Patent: Nov. 1, 2016

(54) METHOD TO CONNECT A MOBILE NODE TO A NETWORK

(75) Inventors: Telemaco Melia, Rolle (CH); Bruno Mongazon-Cazavet, Nozay (FR)

(73) Assignee: Alcatel-Lucent, Boulogne-Billancourt (FR)

( * ) Notice: Subject to any disclaimer, the term of this patent is extended or adjusted under 35 U.S.C. 154(b) by 340 days.

(21) Appl. No.: 13/981,686

(22) PCT Filed: Jan. 4, 2012

(86) PCT No.: PCT/EP2012/050087
§ 371 (c)(1),
(2), (4) Date: Nov. 26, 2013

(87) PCT Pub. No.: WO2012/100969
PCT Pub. Date: Aug. 2, 2012

(65) Prior Publication Data
US 2014/0078979 A1    Mar. 20, 2014

(30) Foreign Application Priority Data
Jan. 28, 2011   (EP) ..................................... 11290059

(51) Int. Cl.
*H04L 29/12* (2006.01)
*H04W 76/02* (2009.01)
(Continued)

(52) U.S. Cl.
CPC ...... *H04W 76/028* (2013.01); *H04L 29/12066* (2013.01); *H04L 29/12301* (2013.01);
(Continued)

(58) Field of Classification Search
None
See application file for complete search history.

(56) References Cited

U.S. PATENT DOCUMENTS

| | | |
|---|---|---|
| 2004/0176095 A1* | 9/2004 | Yamada et al. ............... 455/445 |
| 2005/0226180 A1 | 10/2005 | Devarapalli et al. |

(Continued)

FOREIGN PATENT DOCUMENTS

| | | |
|---|---|---|
| CN | 1666486 A | 9/2005 |
| WO | WO 2004/004281 A1 | 1/2004 |

OTHER PUBLICATIONS

G. Giaretta, Ed., "Mobile IPv6 Bootstrapping in Split Scenario", Oct. 2007, Qualcomm, All.*

(Continued)

*Primary Examiner* — Huy D Vu
*Assistant Examiner* — Bao G Nguyen
(74) *Attorney, Agent, or Firm* — Fay Sharpe, LLP (57) ABSTRACT

The invention relates to a method for connecting a mobile node (1) comprising a plurality of network connection interfaces (11a, 11b) to at least one network (3) using the mobile internet protocol with the following steps for the respective interfaces (11a, 11b): —the mobile node (1) retrieves a local IP address (CoAa, CoAb) and at least one DNS server (5, 5a, 5b) address using DHCP on the interface (11a, 11b), —the mobile node (1) stores in a list the at least one returned DNS server (5, 5a, 5b) address, —the mobile node (1) queries the at least one DNS server (5, 5a, 5b) which has its address stored in the list for home agent service and receives either a "service not supported" failure notification or the address of at least one home agent (9a, 9b) reachable on the interface (11a, 11b),—the mobile node (1) stores in the list the results of the query, either "service not available" or the home agent (9a, 9b) addresses returned for the respective DNS Servers (5, 5a, 5b) inquired, —the mobile node (1) obtains a home address (Ho Aa, Ho Ab) on the interface, _13 the mobile node (1) attempts to perform a binding update for care-of-address (Co Aa, Co Ab) and home address (HoAa, HoAb) towards the at least one home agent (9a, 9b) address stored in the previous list and updates its stored list accordingly with respective binding success or binding failure notifications, in case of success, the mobile node (1) records on the list a fully qualified domain name associated to the interface (11a, 11b). The invention also relates to the associated mobile node and DHCP unit.

12 Claims, 5 Drawing Sheets

(51) Int. Cl.
    *H04W 60/00*     (2009.01)
    *H04W 48/16*     (2009.01)
    *H04W 80/04*     (2009.01)

(52) U.S. Cl.
    CPC ....... *H04L61/1511* (2013.01); *H04L 61/2076* (2013.01); *H04W 48/16* (2013.01); *H04W 60/005* (2013.01); *H04L 29/12226* (2013.01); *H04L 61/2015* (2013.01); *H04W 80/04* (2013.01)

(56) References Cited

U.S. PATENT DOCUMENTS

| | | | |
|---|---|---|---|
| 2008/0159125 A1* | 7/2008 | Ando et al. | 370/221 |
| 2010/0014445 A1* | 1/2010 | Hirano et al. | 370/310 |
| 2010/0215019 A1* | 8/2010 | Velev et al. | 370/331 |

OTHER PUBLICATIONS

G. Giaretta et al., "Mobile IPv6 bootstrapping in split scenario draft-ietf-mip6-bootstrapping-split-04.txt," Internet Engineering Task Force, vol. mip6, No. 4, XP015047934, pp. 1-36, Dec. 19, 2006.
R. Droms et al., "DNS Configuration options for Dynamic Host Configuration Protocol for IPv6 (DHCPv6)," Internet Engineering Task Force, XP015009428, pp. 1-7, Dec. 1, 2003.
Kent Leung et al., "Mobile IP Binding Identifier Extension draft-subbarao-mobileip-bindingid-00.txt," Internet Engineering Task Force, XP015035810, 5 pages, Nov. 1, 1999.
International Search Report for PCT/EP2012/050087 dated Mar. 30, 2012.
G. Giaretta, "Mobile IPv6 bootstrapping in split scenario draft-ietf-mip6-bootstrapping-split-04.txt," Internet Draft, The Internet Society, 2006, 20 pages.

* cited by examiner

METHOD TO CONNECT A MOBILE NODE TO A NETWORK

BACKGROUND OF THE INVENTION

The present invention relates to the field of telecommunications and more specifically of a mobile device connecting simultaneously to multiple networks using mobile IP protocol (MIP) and managing accordingly its at least one DNS identity as visible to other internet nodes.

The Domain Name System (DNS) allows nodes connected to the internet to know each other by using logical names (Fully Qualified Domain Name). This allows nodes to be independent of IP addresses they are assigned at a particular time. Logical names are permanent and represent logical identities of machines while IP addresses are volatile and represent physical addresses where machines can be reached through the internet infrastructure. Specific servers, the Domain Name Servers, maintain relationships between domain names and IP addresses and perform translation between logical names and IP addresses.

To support mobile nodes, routers called home agents (HA) perform tunnelling of data packets from a globally reachable home address (HoA) of the node to a locally assigned IP address of an interface of the mobile node, known as care-of-address (CoA). Said interface is connected at a point in the network corresponding to the geographic position of the mobile node. The care-of-address is updated with the home agent in regular binding update messages, indicating to the home agent where it has to forward the incoming data packets. In addition, a home agent performs updates in the DNS system on behalf of the mobile node to maintain the relationship between the mobile node logical identity (Fully Qualified Domain Name, FQDN) and its current home addrss.

Mobile nodes with multiple interfaces have multiple home addresses each assigned by a separate home agent. Such a mobile node is thus reachable through multiple home addresses. Accordingly, such a mobile node might also be known under either a single logical identity (single FQDN) or multiple logical identities (multiple FQDN) depending on relationships between the home agents and the DNS infrastructure. When the home agents are in the same DNS domain, the mobile node has a single FQDN. When the home agents are in different DNS domains, the mobile node has multiple FQDN.

In the current state of the art, the mobile node attaches through each of its multiple interfaces, obtains a care-of-address, the address of a home agent and a home address. It then binds the home address and care-of-address to the home agent requesting for DNS update. Since no specific mechanism is currently defined to handle the multiple interfaces case, the DNS update process leads to the following behaviours:

in the single FQDN case, the lastly bound home address is always mapped to the FQDN, leading to the use of only the one associated interface at mobile node level,
in the multiple FQDN case, the mobile node is known under separate and unrelated logical identities by the outside world, leading to potential lack of connectivity when one of the mobile interfaces drops.

Both behaviours prevent the mobile node and its correspondents to take full benefit of the multiple-interface capabilities.

SUMMARY OF THE INVENTION

In order to overcome at least partially the aforementioned drawbacks, the invention has for an object a method for connecting a mobile node comprising a plurality of network connection interfaces to at least one network using the mobile internet protocol with the following steps for the respective interfaces:

the mobile node retrieves a local IP address and at least one DNS server address using DHCP on the interface,
the mobile node stores in a list the at least one returned DNS server address,
the mobile node queries the at least one DNS server which has its address stored in the list for home agent service and receives either a "service not supported" failure notification or the address of at least one home agent reachable on the interface,
the mobile node stores in the list the results of the query, either "service not available" or the home agent addresses returned for the respective DNS Servers inquired,
the mobile node obtains a home address on the interface,
the mobile node attempts to perform a binding update for care-of-address and home address towards the at least one home agent address stored in the previous list and updates its stored list accordingly with respective binding success or binding failure notifications, in case of success, the mobile node records on the list a fully qualified domain name FQDN associated to the interface.

In the case of a single domain, the home agent updates the DNS system for all the home addresses provided in the binding update with the same FQDN. In the case of multiple domains, the home agent updates the DNS system for all the home addresses provided in the binding update with all FQDNs also provided in the binding update.

The method allows the bootstrapping of more than one interface with their respective home agent and DNS authorities. In addition it allows the mobile node to be reachable through any of its home address under any of its logical names. In particular, should a home address become unavailable because of an interface failure at mobile node level, the home address of the remaining interface is transparently available under the same logical identity. This allows generic bootstrapping and better over-all connectivity.

The method may also comprise one or more of the following characteristics, taken in combination or separately.

The mobile node establishes a connection to at least two home agents of one domain name server.

The mobile node establishes a connection to at least two home agents of at least two domain name servers.

The method further comprises the step of determining a preference order of the home agents having their address stored on the list, the mobile node establishing a connection with the home agents in decreasing order of preference.

The addresses of home agents connected to the mobile node are used in round-robin order to answer queries.

The binding updates comprise the steps:
the mobile node fills an extended mobility update option with the list of the home addresses and associated fully qualified domain names currently active at mobile node level for the interfaces,
the extension is provided to the home agent,
the home agent updates the DNS servers accordingly.

The extended mobility update option comprises for the home agents a priority field in which is stored a priority value corresponding to the preference order of the home agents.

The fully qualified domain name comprises a concatenation of a mobile node identifier with the domain name returned by the DNS server associated with the home agent.

The retrieving of the home address on the interface is done by using AAA protocol.

Another object of the invention is the associated mobile node comprising a plurality of network connection interfaces to at least one network using the mobile internet protocol configured to:
  retrieve a local IP address and at least one DNS server address using DHCP on the interface,
  store in a list the at least one returned DNS server address,
  query the at least one DNS server which has its address stored in the list for home agent service and to receive either a "service not supported" failure notification or the address of at least one home agent reachable on the interface,
  store in the list the results of service query, either "service not available" or home agent addresses returned per DNS Server inquired,
  obtain a home address on the interface,
  attempt to perform a binding update for care-of-address and home address towards the at least one home agent address stored in the previous list and update the list accordingly with binding success or binding failure notifications, and in case of success, to record on the list a fully qualified domain name associated to the interface.

The mobile node may also have one or more of the following characteristics, taken separately or in combination It comprises at least two connection interfaces configured to establish a connection with at least two home agents of one domain name server.

It comprises at least two connection interfaces configured to establish a connection with at least two home agents of at least two domain name servers.

It is further configured to generate and send an extended mobility update option containing the addresses of the at least two home agents in the binding update messages.

It is further configured to generate and send an extended mobility update option comprising a priority field containing a priority value corresponding to the preference order of the home agents.

Finally, a further object of the invention is a DHCP unit configured to receive a DHCP query from a mobile node and to return in response a list of available DNS server addresses with determined priority values when receiving a DHCP query, the DNS servers having their address in the list comprising home agents for the mobile node to connect with in order of decreasing priority value of the associated DNS server.

Further characteristics of the invention will appear at the reading of the following description, describing by way of example different embodiments with reference to the accompanying drawings, in which.

In all figures the same references relate to the same elements.

Definitions

The terms hereafter are used according to their definition in the Internet Engineering Task Force communications RFC 3775 and RFC 5206.

In particular, following definitions are in use.

Node: a device that implements IP.

Router: a node that forwards IP packets not explicitly addressed to itself.

Interface: a node's attachment to a link.

Link: a communication facility or medium over which nodes can communicate at link layer. The link layer is the layer immediately below IP.

Mobile node: a node that can change its point of attachment from one link to another, while still being reachable via its home address.

Home Address (HoA): a unicast and globally routable address assigned to a mobile node.

Care-of-Address (CoA): a unicast and locally routable address associated with a mobile node while visiting a foreign link, the one registered with the mobile node's home agent for a given home address is called "primary care-of-address".

Unicast routable address: an identifier for a single interface such that a packet sent to it from another IPv6 subnet is delivered to the interface identified by that address. Accordingly, a unicast routable address must have either global or site local scope (but not link local).

Home Agent: a router on a mobile node's link with which the mobile node has registered its current care of address. While the mobile node is away from home, the home agent intercepts packets on the home link destined to the mobile node's home address, encapsulates them and tunnels them to the mobile node's registered care-of-address.

DETAILED DESCRIPTION OF THE INVENTION

The invention relates to a method for connecting a mobile node to a wireless network.

In particular, the network supports mobile IP (MIP), and even more specifically the MIPv6 version of mobile IP.

Figure 1:
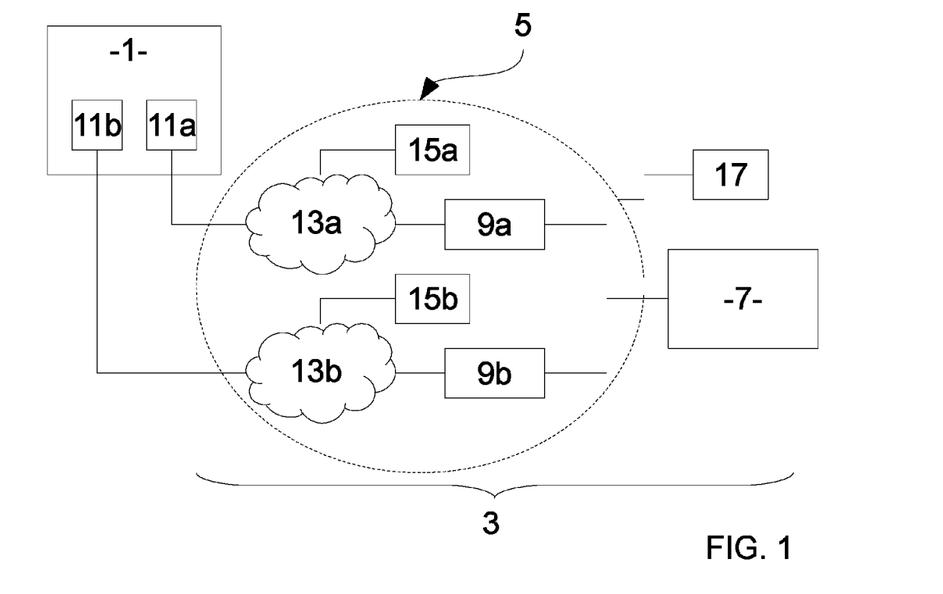
FIG. 1 represents schematically one embodiment of a mobile node connected to several home agents in the same domain.

In FIG. 1 is depicted an embodiment of the configuration using an embodiment of the method according to the invention.

The mobile node 1 is connected via a mobile access, possibly wireless radio access, to a network 3. The mobile node 1 is connected to a domain name server 5, said domain name server 5 being connected to the internet 7.

The domain name server 5 comprises several home agents 9a, 9b used for tunnelling of the data packets from a home address of the node 1 and a care-of-address CoA of the node 1. To attach to these home agents 9a, 9b, the mobile node 1 uses a set of different care-of-addresses CoAa, CoAb in corresponding interfaces 11a, 11b. The interfaces 11a, 11b are bound with the used home agents 9a, 9b via an IP net 13a, 13b. The IP networks allow dynamic host configuration protocol (DHCP) using a respective DHCP unit 15a, 15b.

In the scenario called split scenario, the mobility service and the network access are authorized by different functions. The DNS server and home agents authorize the mobility, whereas another unit is in charge of the security aspects. The Authentication, Authorization and Accounting (AAA) protocol is used for said security aspects. Therefore an AAA unit 17 is associated to the domain name and domain name server 5.

Figure 2:
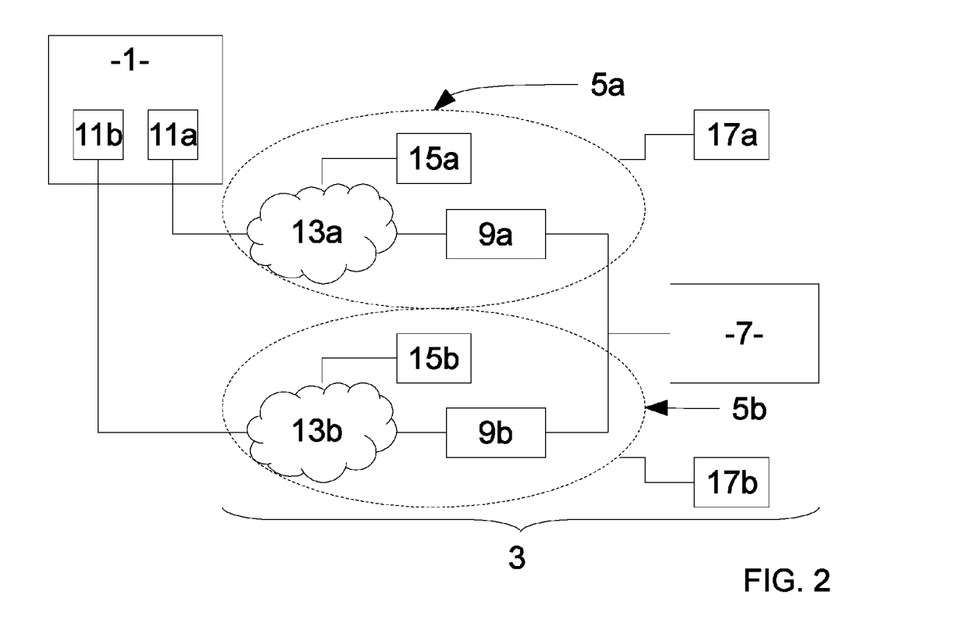
FIG. 2 represents schematically one embodiment of a mobile node attached to different domains using different home agents.

In FIG. 2 is depicted another embodiment of a configuration using another embodiment of the method according to the invention. The mobile node is connected to a network 3 comprising different domain name servers 5a, 5b. The domain name servers 5a, 5b comprise different home agents 9a, 9b. To attach to these home agents 9a, 9b, the mobile node 1 uses a set of different care-of-addresses in different interfaces 11a, 11b corresponding one-to-one with the used home agents 9a, 9b via IP networks 13a, 13b allowing dynamic host configuration protocol DHCP using respective DHCP units 15a, 15b. In the split scenario case, the domain name servers 5a, 5b are associated to a respective AAA unit 17a, 17b.

The realistic case implies a combination of the precedent cases of FIGS. 1 and 2. In said realistic case, multiple domain name servers 5a, 5b are considered, which can all comprise several home agents 9a, 9b.

Figure 3:
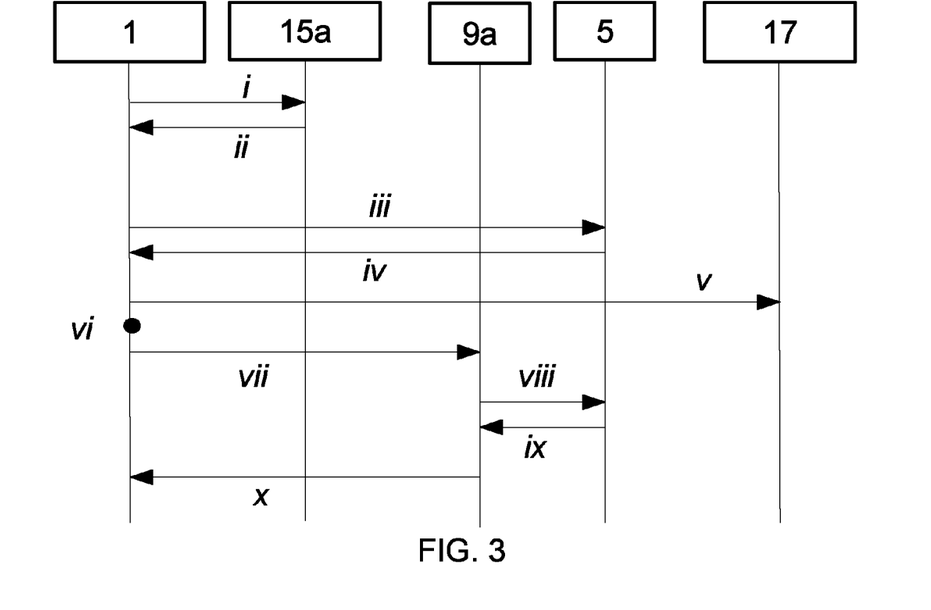
FIG. 3 and FIG. 4 represent schematically one embodiment of the associated method to establish the connection in the configuration of FIG. 1, FIG. 5, FIG. 6 and FIG. 7 represent schematically one embodiment of the associated method to establish the connection in the configuration of FIG. 2, FIG. 8 and FIG. 9 represent schematically one embodiment of a method to detect and list available home agents on different DNS servers.
Figure 4:
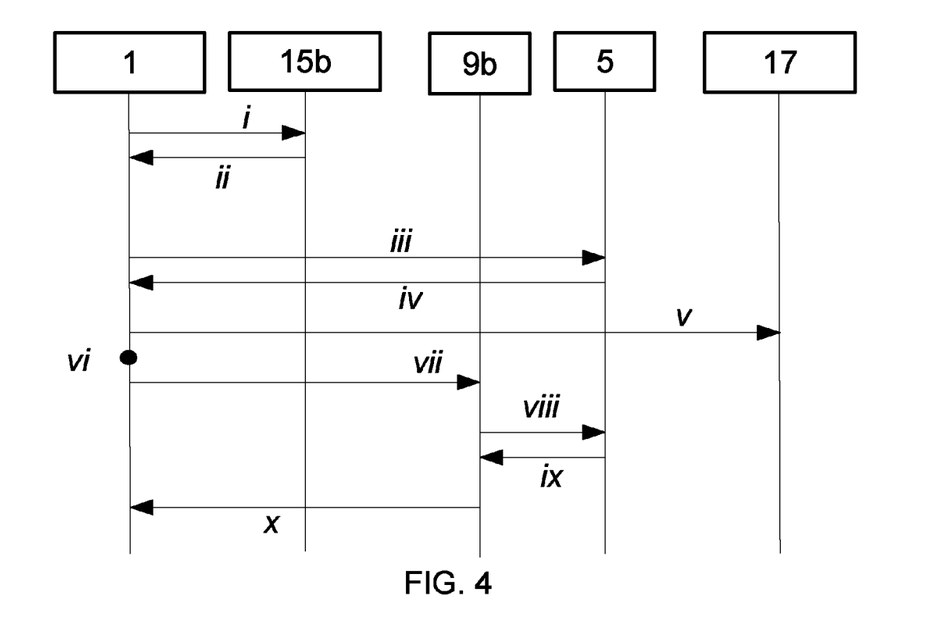

In FIGS. 3 and 4 is depicted an embodiment of the method for the mobile node 1 to attach to home agents 9a, 9b associated to one DNS server 5, with an AAA unit 17. This corresponds to a split scenario in the configuration of FIG. 1.

The different elements exchanging messages in this method are represented by vertical lines, the exchanged messages are represented by horizontal arrows from the emitter to the receiver. The steps are depicted chronologically along the vertical direction, from top to bottom.

In FIG. 3 is depicted the part of the process concerning the bootstrapping of first interface 11a. From left to right are represented: the mobile node 1, the first DHCP unit 15a, the first home agent 9a, the DNS server 5 and the AAA unit 17.

The addresses mentioned and used hereafter also serve as identifiers of the elements they correspond to.

In the first step i the mobile node 1 sends a DHCP request to the DHCP unit 15a. In step ii the DHCP unit 15a responds with a DHCP response containing the care-of-address CoAa attributed to interface 11a, the local domain name and the local DNS server 5 address. The mobile node 1 then sends in iii, a DNS query for MIP service to the DNS server 5, with local domain name as provided in ii. The DNS server 5 responds with a DNS reply in iv containing the address of the first home agent 9a. In v, the mobile node 1 retrieves the HoAa for the interface 11a from AAA unit 17 using Security Association (SA).

The following steps correspond to the binding update in the multi-interface case of FIG. 1, that is with one domain and DNS server 5.

In vi, the mobile node 1 builds an extended DNS update option. The extended update option is built with the list of the currently bound addresses on the interface 11a. Said update option contains the home address HoAa of the mobile node associated to the first home agent 9a and the DNS domain name of the mobile node 1 in DNS server 5, possibly fully qualified domain name FQDN obtained by concatenation of a mobile node identifier maid and the domain name returned by DNS server 5. Following, the mobile node 1 sends in vii a MIP binding update message BU to the home agent 9a containing the extended DNS update option. In the following step viii, the home agent 9a performs a DNS update with the DNS server 5, regarding domain name of the mobile node 1 and the home address HoAa within first home agent 9a. The DNS server 5 responds with a DNS reply in ix. The last step x is the sending of a binding acknowledgement message BA from the home agent 9a to the mobile node 1.

In FIG. 4 is depicted the part of the process concerning the bootstrapping of second interface 11b. From left to right are represented: the mobile node 1, the second DHCP unit 15b, the second home agent 9b, the DNS server 5 and the AAA unit 17.

In the first step i of FIG. 4, the mobile node 1 sends a DHCP request to the second DHCP unit 15b. In step ii the second DHCP unit 15b responds with a DHCP response containing the second care-of-address CoAb attributed to interface 11b, the domain name and the local DNS server 5 address. The mobile node 1 then sends in iii, a DNS query for MIP service to the DNS server 5, with the local domain name as provided in ii. The DNS server 5 responds with a DNS reply in iv containing the address of the second home agent 9b. In v, the mobile node 1 retrieves the HoAb for the interface 11b from AAA unit 17 using Security Association (SA).

The following steps correspond to the binding update of the second interface 11b.

In vi, the mobile node 1 builds an extended DNS update option. The extended update option is built with the list of currently bound addresses on all the interfaces 11a and 11b. Said update option contains in particular the home addresses HoAa and HoAb of the mobile node associated to the first and second home agents 9a and 9b, along with the DNS domain name of the mobile node 1 in DNS server 5, possibly fully qualified domain name FQDN.

Following, the mobile node 1 sends in vii a MIP binding update message BU to the home agent 9b containing the extended DNS update option. In the following step viii, the home agent 9b performs a DNS update with the DNS server 5, regarding domain name of the mobile node 1 in DNS server 5 and the home addresses HoAa and HoAb within first and second home agents 9a, 9b. The DNS server 5 responds with a DNS reply in ix. The last step x is the sending of a binding acknowledgement message BA from the home agent 9b to the mobile node 1.

The process can also implement additional interfaces and corresponding home agents. For a third interface, the steps i to v would be repeated with the addresses corresponding to said third interface and third home agent. The extended DNS update option would be generated with the three home addresses on the three home agents and further steps vii to x corresponding to the binding update would be performed taking into account the three addresses.

Figure 5:
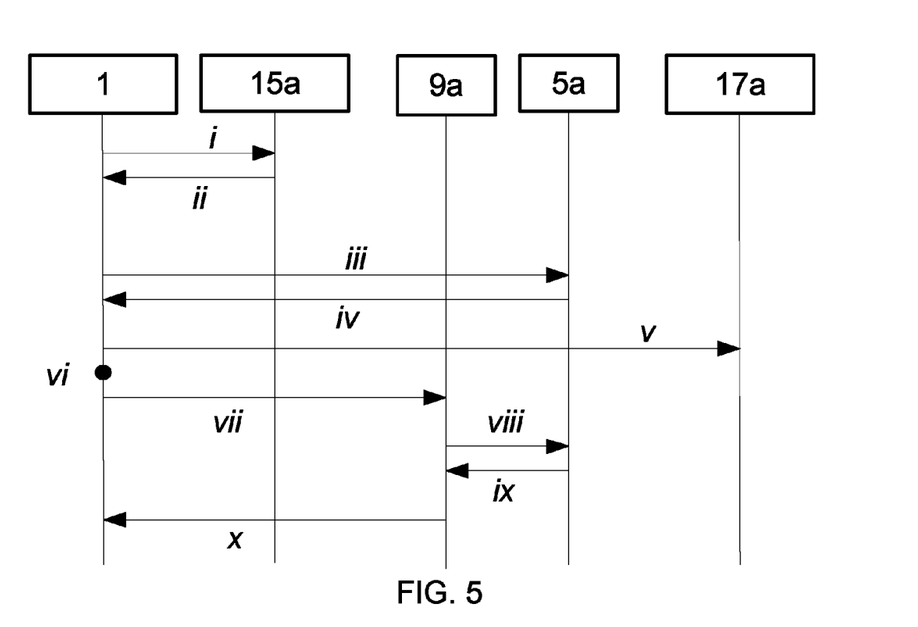
Figure 6:
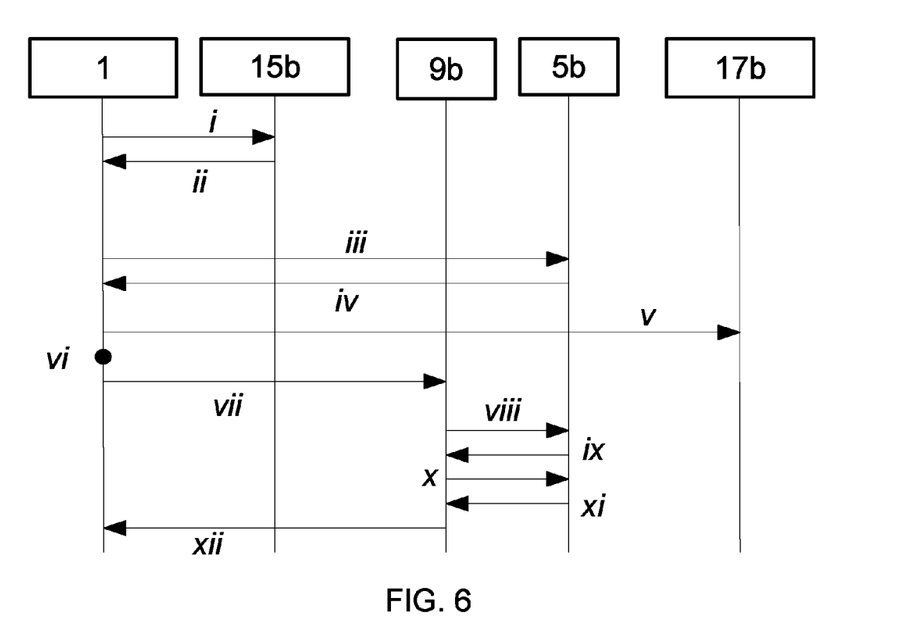
Figure 7:
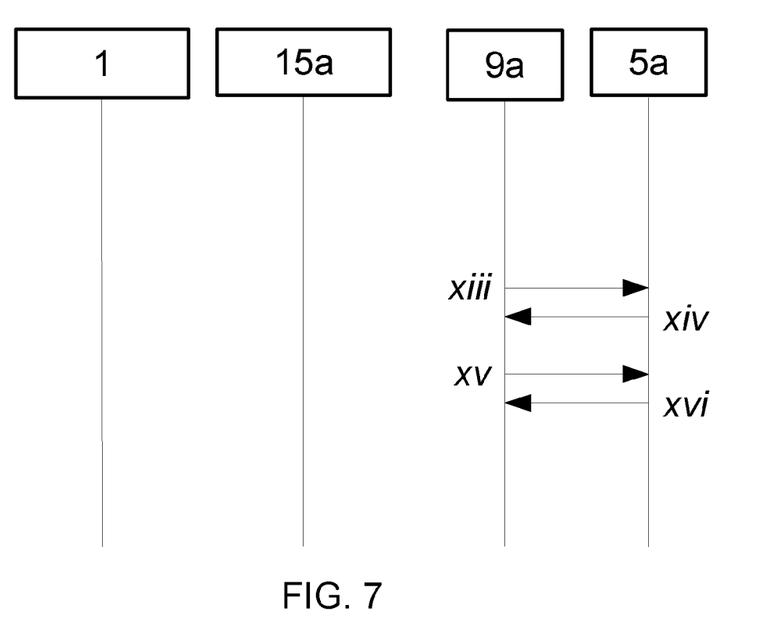

FIGS. 5, 6 and 7 depict the steps of the binding of the mobile node 1 in the case corresponding to FIG. 2, where the network 3 comprises more than one DNS server 5a, 5b. Their global form is similar to that of FIGS. 3 and 4.

In FIG. 5 is depicted the part of the process concerning the bootstrapping of first interface 11a. From left to right are represented: the mobile node 1, the first DHCP unit 15a, the first home agent 9a, the first DNS server 5a and the associated first AAA unit 17a.

In the first step i of FIG. 5, the mobile node 1 sends a DHCP request to the first DHCP unit 15a of first DNS server 5a. In step ii the DHCP unit 15a responds with a DHCP response containing the first care-of-address CoAa attributed to interface 11a, the domain name in first DNS server 5a and the first DNS server 5a address. The mobile node 1 then sends in iii, a DNS query for MIP service to the first DNS server 5a with local domain name as provided in figure ii. The first DNS server 5a responds with a DNS reply in iv containing the address of the first home agent 9a. In v, the mobile node 1 exchanges retrieves the HoAa for the interface 11a from AAA unit 17a using Security Association (SA).

The following steps correspond to the binding update in the case of FIG. 2.

In vi, the mobile node 1 build an extended DNS update option. The extended update option is built with the list of the currently bound addresses on the interface 11a. Said update option contains in particular the home address HoAa of the mobile node associated to the first home agent 9a on first DNS server 5a, and the DNS domain name of the mobile node 1 in first DNS server 5a, possibly fully qualified domain name FQDN.

Following, the mobile node 1 sends in vii a MIP binding update message BU to the home agent 9a containing the extended DNS update option. In the following step viii, the home agent 9a performs a DNS update to the first DNS server 5a, indicating domain name in first DNS server 5a of the mobile node 1 related to the home agent 9a and the home address HoAa within said home agent 9a. The first DNS server 5a responds with a DNS reply in ix. The last step x is the sending of a binding acknowledgement message BA from the home agent 9a to the mobile node 1.

In FIG. 6 is depicted the part of the process concerning the bootstrapping of second interface 11a. From left to right are represented : the mobile node 1, the second DHCP unit 15b, the second home agent 9b, the second DNS server 5b and the associated second AAA unit 17b.

In the second step i of FIG. 5, the mobile node 1 sends a DHCP request to the second DHCP unit 15b of second DNS server 5b. In step ii the DHCP unit 15b responds with a DHCP response containing the second care-of-address CoAb attributed to interface 11b, the domain name in second DNS server 5b and the second DNS server 5b address. The mobile node 1 then sends in iii, a DNS query for MIP service to the second DNS server 5b, with local domain name as provided in ii. The second DNS server 5b responds with a DNS reply in iv containing the address of the second home agent 9b. In v, the mobile node 1 retrieves the HoAb for the interface 11b from AAA unit 17b using Security Association (SA).

The following steps correspond to the binding update BU of interface 11b.

In vi, the mobile node 1 build an extended DNS update option. The extended update option is built with the list of currently bound addresses on the interfaces 11a and 11b on both DNS servers 5a, 5b. Said update option contains in particular the home address HoAa of the mobile node 1 associated to the first home agent 9a and the domain name of the mobile node 1 in first DNS server 5a, and the home address HoAb of the mobile node associated to the second home agent 9b and the domain name of the mobile node 1 in second DNS server 5b.

Following, the mobile node 1 sends in vii a MIP binding update message BU to the home agent 9a containing the extended DNS update option. In the following step viii, the home agent 9a performs a DNS update with the second DNS server 5b, regarding domain name in second DNS server 5b of the mobile node 1 and the home addresses HoAa and HoAb in first and second home agents 9a, 9b. The second DNS server 5b responds with a DNS reply in ix.

In step x, the home agent 9a performs a DNS update with the second DNS server 5b, regarding domain name in first DNS server 5a of the mobile node 1 and the home addresses HoAa and HoAb in first and second home agents 9a, 9b. The second DNS server 5b responds with a DNS reply in xi. Last step xii on FIG. 6 is the sending of a binding acknowledgement message BA from the home agent 9a to the mobile node 1.

The update process continues with the steps pictured on FIG. 7, where the mobile node 1 performs a second binding update with the first home agent 9a and the first DNS server 5a, with the extended DNS update option taking into account the addresses on both interfaces 11a, 11b and associated domain names as delivered by DNS servers 5a and 5b.

From left to right are represented on FIG. 7: the mobile node 1, the first DHCP unit 15a, the first home agent 9a and the first DNS server 5a. The steps are labelled xiii to xvi, as they take place right after the process represented on FIG. 6.

On emission of binding acknowledgement in step xii in FIG. 6 by the second home agent 9b, the first home agent 9a performs in step xiii a DNS update with the first DNS server 5a, regarding domain name in first DNS server 5a of the mobile node 1 and the home addresses HoAa and HoAb in first and second home agents 9a, 9b. The first DNS server 5a responds with a DNS reply in xiv.

In step xv, the home agent 9a performs a DNS update with the first DNS server 5a, regarding domain name in second DNS server 5b of the mobile node 1 and the home addresses HoAa and HoAb in first and second home agents 9a, 9b. The first DNS server 5a responds with a DNS reply in xvi.

In a similar way, the mobile node could comprise more than two interfaces 11a, 11b and the network 3 could comprise more than two DNS servers 5a, 5b with respectively more than one home agents 9a, 9b. The process to bind them can be derived from the examples developed above.

While the cases of FIGS. 1 and 2 are examples, the general case is a combination of both, in which a plurality of DNS servers 5, 5a, 5b all comprise a plurality of home agents 9a, 9b. In said general case, the binding process to apply is the corresponding combination of the aforementioned processes.

When using multiple home agents 9a, 9b, in the single domain embodiment, the mobile node 1 can specify on which address (HoAa, HoAb . . . ) to be contacted first. To determine said address, the different home agents 9a, 9b receive a priority value. Said value can be added in an additional field in the extended DNS update mobility option. For example, if the priority field accounts for eight bits, there are 254 possible priority values. Said priority field is transmitted to the home agents 9a, 9b in the binding update message BU.

A dynamic DNS update can then go as described hereafter.

At first, the home agent receiving the binding update message BU containing the DNS update mobility option checks if the mobile node 1 has or not already registered a specific suffix and associated address. To do so, the home agent 9a, 9b can for example perform a DNS lookup on the fully qualified domain name of the mobile node 1.

If the mobile node 1 has not registered any record, the home agent 9a, 9b can simply register the new IP address.

If the mobile node 1 has already registered an address with no priority, corresponding to a "00" priority field, then the home agent 9a, 9b can replace the address.

If the mobile node 1 has already registered an address with a low priority, corresponding for example to a "01" priority field, then the home agent registers both prefixes by adding the low priority one to the existing record.

If the mobile node 1 has already registered an address with a high priority, corresponding for example to a "10"

priority field, then the home agent registers both prefixes by adding the high priority one at the beginning of the existing record.

The priority values can be adapted by the mobile node 1 according to suffix matching, domain name matching, source and destination matching.

When using several addresses with the same name, the queries can be answered with a change in address order. By using for example a round-robin or cyclic change in used addresses, congestion at home agent level can be avoided. To obtain said round-robin change, every time a predetermined amount of queries has been answered, the address that is first in the list is set at the end of said list.

Figure 8:
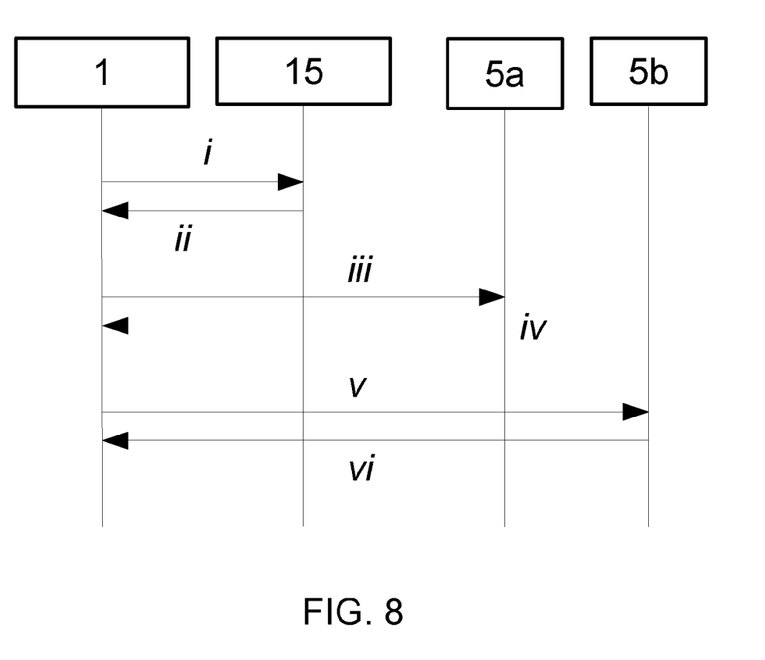
Figure 9:
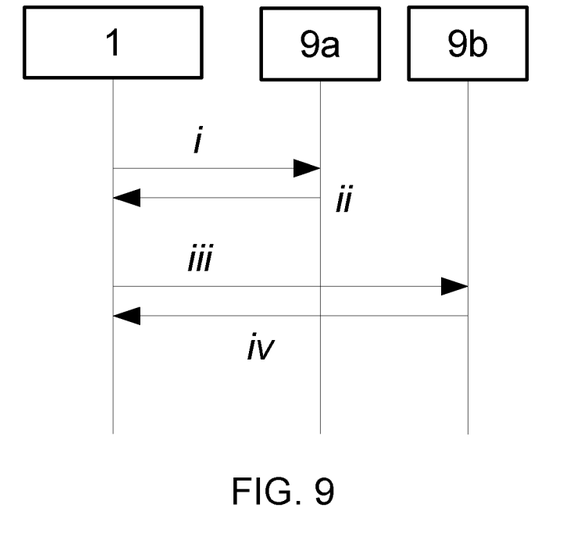

One embodiment of the method to detect and list home agents 5a, 5b is depicted in FIGS. 8 and 9. Both figures are similar in form to the FIGS. 3 to 7.

On FIG. 8 are represented from left to right: the mobile node 1, a DHCP unit 15, a first DNS server 5a, and a second DNS server 5b.

In first step i the mobile node sends to the DHCP unit 15 a DHCP query. In ii, the DHCP 15 unit responds with a DHCP answer containing the care-of-address, the domain and a set of available DNS server addresses, containing the addresses of servers 5a and 5b, possibly with their given priority. In this example server 5a has a higher priority than 5b.

Then the mobile node checks if the DNS servers 5a, 5b provide MIP mobility service.

In iii, the mobile node sends to first DNS server 5a in the set in order of decreasing priority a DNS query. The DNS query contains in particular a request for a MIP mobility service and the domain name as provided in ii. In this example, the first server 5a answers to the mobile node with a denying in step iv because it does not provide the MIP service. Consequently, the mobile node stores DNS server 5a as "MIP unavailable" in the list.

Then in step v, the mobile node 1 repeats step iii with DNS server 5b, next in decreasing priority order. In step vi, the second DNS server 5b, supporting MIP, replies with a DNS grant reply containing the hosted home agents addresses in DNS server 5b, possibly in order of priority. The mobile node stores DNS server 5b as "MIP available" in the list as well as home agent addresses and then proceeds to the home agent selection in FIG. 9.

On FIG. 9 are represented from left to right: the mobile node 1, a first home agent 9a, and a second home agent 9b.

In step i the mobile node sends a binding update message BU containing an extended mobility update option determined as described above to the first home agent 9a in order of decreasing priority. In this example, said home agent 9a does not support MIP and consequently answers in ii with a binding rejection. Consequently, the mobile node records the home agent 9a as "not available" in the list.

In step iii the mobile node repeats step i with the next home agent in order of decreasing priority 9b. Since in this example home agent 9b supports MIP, it responds in step iv with a binding acknowledgement message BA. This home agent 9b is then stored in the list, along with the associated care-of-address, home address and priority value.

If other DNS server addresses are in the set provided in step ii of FIG. 8, the mobile node 1 continues DNS server selection as in FIG. 8 and possibly home agent selection as in FIG. 9 until the end of the list is reached.

The invention allows the parallel binding and updating of home agents 9a, 9b for a mobile node 1 including DNS update behavior. This should provide improved reliability of the connection as the loss of connection to one home agent can be compensated by the connection to another one. Furthermore, by setting preferences in the list of home agents 9a, 9b the overall quality can be improved. Furthermore, if the provider supports, more than one connection can be used at a time so that greater upload and download speed can be expected.

It should also be noted that the invention relies on small modifications of already existing standards, in MIPv6 in particular and no additional hardware is required.

The invention claimed is:

1. A method for connecting a mobile node comprising a plurality of network connection interfaces to at least one network using the mobile internet protocol, wherein said method comprises the following steps for each of the respective interfaces:
    the mobile node retrieving a care-of-address and at least one DNS server address using DHCP on the interface,
    the mobile node storing in a list the at least one returned DNS server address,
    the mobile node querying the at least one DNS server which has its address stored in the list for home agent service and receiving either a "service not supported" failure notification or the address of at least one home agent reachable on the interface,
    the mobile node storing in the list results of the querying, said result being either "service not available" or the home agent addresses returned for the respective DNS Servers inquired,
    the mobile node obtaining a home address for the interface,
    the mobile node attempting to perform a binding update for the care-of-address and the home address towards the at least one home agent address stored in the previous list and updating its stored list accordingly with respective binding success or binding failure notifications, and in case of success, the mobile node recording on the list a fully qualified domain name associated to the interface;
    and wherein the binding update comprise the steps of:
    the mobile node filling an extended mobility update option with a list of the at least one home address along with a fully qualified domain name currently active at the mobile node level for the interfaces, the fully qualified domain name comprising a concatenation of a mobile node identifier and a domain name returned by the DNS server, and
    the extended mobility update option being provided to the at least one home agent to allow it to update the at least one DNS server with the list of the home addresses and associated fully qualified domain names currently active at the mobile node level.

2. The method according to claim 1, wherein the mobile node establishes a connection to at least two home agents of one domain name server.

3. The method according to claim 1, wherein the mobile node establishes a connection to at least two home agents of at least two domain name servers.

4. The method according to claim 1, further comprising determining a preference order of the home agents having their address stored on the list, the mobile node establishing a connection with the home agents in decreasing order of preference.

5. The method according to claim 1, wherein the addresses of home agents connected to the mobile node are used in round-robin order to answer queries.

6. The method according to claim 1, wherein the extended mobility update option comprises for the home agents a priority field in which is stored a priority value corresponding to the preference order of the home agents.

7. The method according to claim 1, wherein the retrieving of the home address on the interface is done by using AAA protocol.

8. A mobile node comprising a plurality of network connection interfaces for connecting to at least one network using a mobile internet protocol, said mobile node being configured to:
retrieve a care-of-address and at least one DNS server address using DHCP on the interface,
store in a list the at least one returned DNS server address,
query the at least one DNS server which has its address stored in the list for home agent service and to receive either a "service not supported" failure notification or the address of at least one home agent reachable on the interface,
store in the list results of the query, said result being either "service not available" or home agent addresses returned per the DNS server inquired,
obtain a home address for the interface,
attempt to perform a binding update for the care-of-address and the home address towards the at least one home agent address stored in the previous list and update the list accordingly with binding success or binding failure notifications, and in case of success, to record on the list a fully qualified domain name associated to the interface;
said binding update comprising the steps of:
the mobile node filling an extended mobility update option with a list of the at least one home address along with a fully qualified domain name currently active at the mobile node level for the interfaces, the fully qualified domain name comprising a concatenation of a mobile node identifier and a domain name returned by the DNS server, and
the extended mobility update option being provided to the at least one home agent to allow it to update the at least one DNS server with the list of the home addresses and associated fully qualified domain names currently active at the mobile node level.

9. The mobile node according to claim 8, wherein it comprises at least two connection interfaces configured to establish a connection with at least two home agents of one domain name server.

10. The mobile node according to claim 8, wherein it comprises at least two connection interfaces configured to establish a connection with at least two home agents of at least two domain name servers.

11. The mobile node according to claim 8, further configured to generate and send an extended mobility update option containing the addresses of the at least two home agents in the binding update messages.

12. The mobile node according to claim 11, further configured to generate and send an extended mobility update option comprising a priority field containing a priority value corresponding to the preference order of the home agents.

\* \* \* \* \*